United States Patent [19]

Cronkhite et al.

[11] Patent Number: 4,593,870

[45] Date of Patent: Jun. 10, 1986

[54] ENERGY ABSORBING COMPOSITE AIRCRAFT STRUCTURE

[75] Inventors: James D. Cronkhite, Hurst; Thomas J. Haas, Grand Prairie; Raymond W. Mort, Hurst, all of Tex.

[73] Assignee: Bell Helicopter Textron Inc., Fort Worth, Tex.

[21] Appl. No.: 530,987

[22] Filed: Sep. 9, 1983

[51] Int. Cl.⁴ .................................................. B64C 1/06
[52] U.S. Cl. ........................... 244/117 R; 244/17.11; 244/119; 188/375
[58] Field of Search .................. 244/117 R, 119, 121, 244/17.11; 188/377, 375; 293/60, 70, 73, 89, 87, 97, 64, 84, 86, 133, DIG. 9, 98, 120

[56] References Cited

U.S. PATENT DOCUMENTS

| 3,082,846 | 3/1963 | Jensen et al. | 188/377 |
| 3,143,321 | 8/1964 | McGehee et al. | 244/100 |
| 3,265,163 | 8/1966 | Gilbert et al. | 188/377 |
| 4,023,652 | 5/1977 | Torke | 188/1 |
| 4,062,994 | 12/1977 | Milliman | 428/101 |
| 4,084,029 | 4/1978 | Johnson et al. | 244/131 |
| 4,221,413 | 9/1980 | Bonnetain | 188/377 |
| 4,336,868 | 7/1982 | Wilson | 188/376 |
| 4,431,221 | 2/1984 | Jahnle | 188/377 |

FOREIGN PATENT DOCUMENTS

| 645207 | 7/1962 | Canada | 267/44 |
| 1378130 | 12/1974 | United Kingdom | 188/377 |
| 1489065 | 10/1977 | United Kingdom | 188/377 |

OTHER PUBLICATIONS

"Composites May Enable Chopper to Survive Crashes", Machine Design, Sep. 9, 1982 at pp. 58-59.
Ford et al., "Advanced Composite Airframe Program", vol. 1-Part 1, pp. 45-82, USAAVRADCOM-TR-8-0-D-36A, Dec. 1981, pp. 155-190.
"Crash Survival Design Guide", USAAMRDL-TR-7-1-22, Oct. 1971, pp. 81-88.

Primary Examiner—Galen L. Barefoot
Attorney, Agent, or Firm—Richards, Harris, Medlock & Andrews

[57] ABSTRACT

An energy absorber is provided. The energy absorber includes a thin panel (78) formed of composite materials (84) for reacting compression forces in the plane of the panel (78) between two opposed edges thereof. The panel (78) is constructed to resist overall bending failure when force is applied to the opposite edges. The energy absorber further includes force receiving structure (90, 92) for receiving forces directly to one of the edges and for receiving forces to the opposite edge of the panel (78) to initiate local folding parallel to the other edge for progressing crushing and local folding of the panel (78).

6 Claims, 13 Drawing Figures

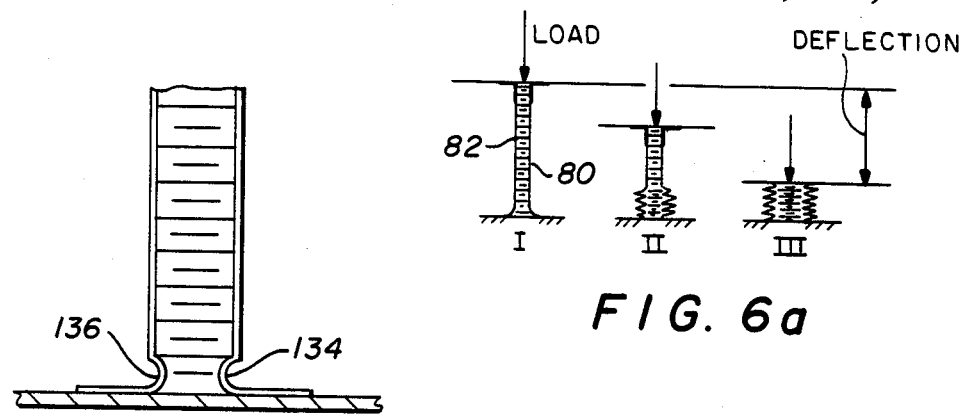
FIG. 11
FIG. 6a
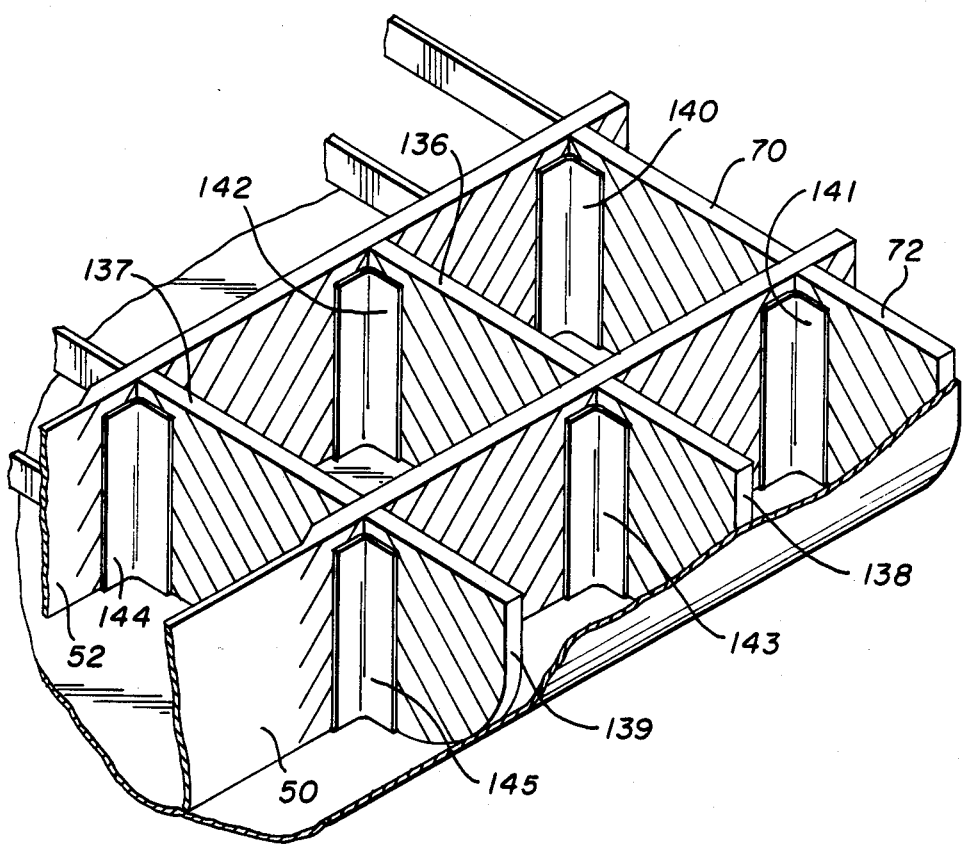
FIG. 12

ENERGY ABSORBING COMPOSITE AIRCRAFT STRUCTURE

TECHNICAL FIELD

This invention relates to controlled progressively crushable panel structures of composite materials which may form a crush zone to absorb crash energy and improve the crash-worthiness of aircraft.

BACKGROUND ART

Increase in crash-worthiness is an ongoing challenge for the manufacturer of aircraft such as helicopters. The aircraft must be strong enough to maintain integrity of structure defining the crew and passenger compartments while being able to deform so that injurious loads are not transmitted to occupants. If there is no crush zone under a helicopter floor, crashes are characterized by high peak loads that can heave up the floor resulting in loss of structural integrity of the fuselage and the structure for seating and for support of large masses such as the propulsion system comprising the transmission and rotor. Ideally, a fuselage should absorb crash energy to control deformation of a crush zone without exceeding the structural capability of the floor and the structure supporting the propulsion system. The aim is to have the components of the helicopter stay in place and the passenger area retain its shape.

Heretofore metals which absorb energy through plastic deformation have been the prime material utilized in attempts to provide crash-worthy structures.

Currently, composite materials are used for the construction of airframes. Composite materials as used herein shall be taken to mean fiber reinforced plastic materials. Composite materials are being used because of reduced cost, reduced weight and improved corrosion resistence. However, such materials are not characterized by having plasticity and therefore must absorb energy by other means.

DISCLOSURE OF THE INVENTION

In accordance with the present invention, crushable energy absorbers are provided which include thin panel means of composite materials for reacting compression forces applied in the plane of the panel means between two opposite edges of the panel means. The panel means is constructed to resist overall bending failure upon application of said forces to the two opposite edges. The absorbers are self-supporting with means for receiving force directly to one of the edges and for receiving force at the opposite edge with a lateral component to initiate local folding at and parallel to said opposite edge for progressively crushing and folding the panel means paralleled to said edges where the crushing is locally confined as folding progresses from said opposite edge to said one edge of the panel means.

BRIEF DESCRIPTION OF THE DRAWINGS

For a more complete understanding of the present invention and for further objects and advantages thereof reference may now be had to the following Description taken in conjunction with the accompanying Drawings in which:

FIG. 6a diagrammatically illustrates progressive folding of the panel of FIG. 6;

FIG. 11 is a portion of a crushable structure showing a beaded bottom portion for initiating crushing; and FIG. 12 illustrates an embodiment of structures shown in FIG. 6 with corner control elements.

DETAILED DESCRIPTION

In accordance with the invention there is provided energy absorbing mechanism which may be used in and activated in a controlled way as when a fuselage impacts a hard surface. Energy absorbing members are provided constructed of composite materials such as graphite, fiberglass or Kevlar, an aramide fiber manufactured and sold by the DuPont Company. A triggering device limits peak loads and induces controlled uniform crushing. In an aircraft, the triggering device would be located along the interface with the under skin to provide efficient double usage of structure of the aircraft, namely flight and crash usage. It may prevent uncontrolled high peak load from damaging the structural shell with controlled failure modes as well as serving as efficient energy absorbers.

FIG. 1

Figure 1:
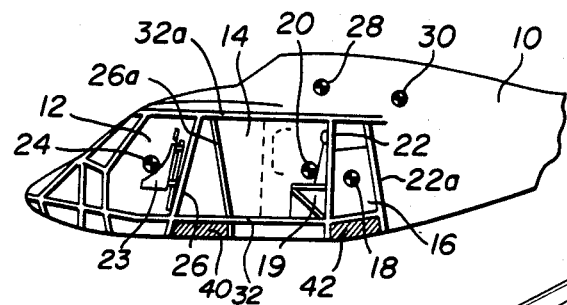
FIG. 1 is a diagrammatic view of the cabin portion of a helicopter looking inboard from the left side.

FIG. 1 illustrates a portion of a helicopter looking inboard from the left hand side and with the left side skin broken away. The airframe fuselage 10 is structured to provide for a pilot compartment 12 and a passenger compartment 14. A fuel compartment 16 has a center of gravity 18. A passenger seat 19 is provided for support of a passenger whose center of gravity 20 is located just forward of a bulkhead 22. A pilot seat 23 is provided for supporting a pilot whose center of gravity 24 is just forward of a bulkhead 26. The coupling between the propulsion system (not shown) and the fuselage 10 is at points 28 and 30.

The pilot's compartment 12 and the passenger compartment 14 as well as the fuel compartment 16 are all located above a high strength cabin floor 32. The roof of the compartments 12 and 14 and the fuel compartment 16 together with the propulsion system are supported above floor 32 by bulkheads 22, 22a, 26 and 26a.

Zone 40 beneath floor 32 located between bulkhead structures 26 and 26a is provided with controlled composite crushable structures embodying the present invention. Similarly, a zone 42 located between bulkheads 22 and 22a and below the floor 32 is provided with controlled composite crushable structures.

In FIG. 1, the bulkheads 26 and 26a along with floor 32 and roof 32a form a trapezoidal structure. This provides for transmission of forces from roof 32a to floor 32. Similarly, bulkheads 22 and 22a apply forces from the roof 32a to floor 32. By this means the pilot's compartment 12 and the passenger compartment 14 are protected from overhead loads.

FIG. 2

Figure 2:
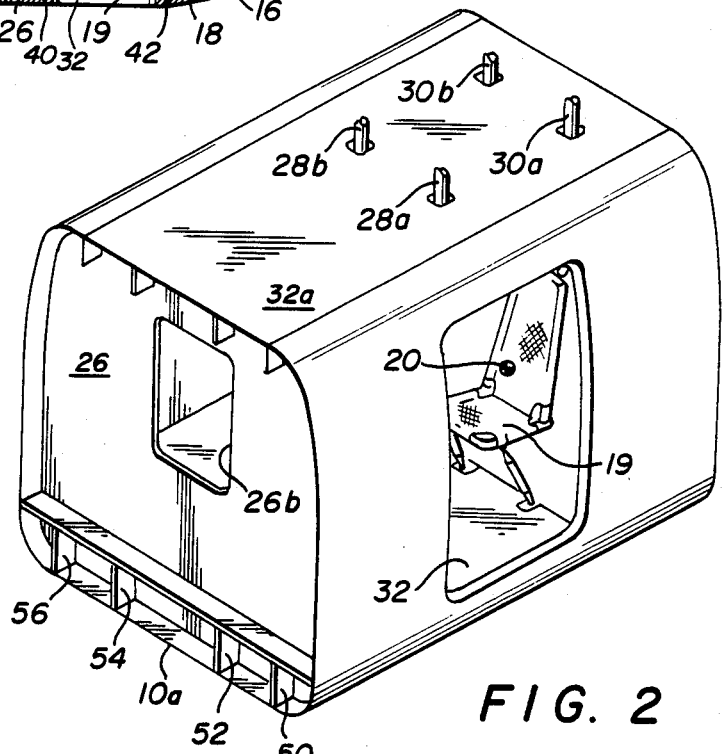
FIG. 2 is an isometric drawing of a portion of a helicopter cabin section.

FIG. 2 illustrates a portion of the cabin of FIG. 1 wherein the bulkhead 26 is a composite panel with an opening 26b therein and extending from floor 32 to ceiling 32a. Links 28a, 28b, 30a, 30b represent the coupling between the roof 32a and the propulsion system (not shown).

The floor 32 is spaced above the under skin 10a in this embodiment by keel beams 50-56.

In accordance with the invention, structures may be provided to establish energy absorbing crush zones at selected spaced locations beneath floor 32. Passenger seat 19 may be mounted with energy absorbers to further reduce crash force on the occupant.

FIG. 3

Figure 3:
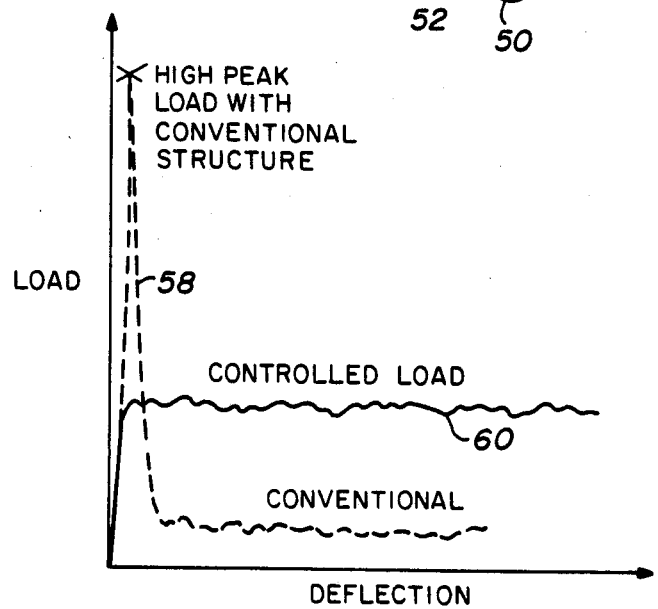
FIG. 3 is a graph showing the relationship between crush zone load-deflection characteristics of conventional structures and of structures embodying the present invention.

Typically, with no crush zone under a helicopter floor, a crash is characterized by a high peak load and low energy absorption. A high peak load is illustrated in FIG. 3 for conventional structures where the peak in the dotted curve 58 is indicative of an abrupt buildup upon contact followed by drastic reduction in load after failure with low energy absorption, which is proportional to the area under curve 58.

In accordance with the present invention, controlled crushable structures are provided which react to the loads imposed by bulkhead members 26, 26a, 22 and 22a. Resultant forces indicated by curve 60, here of maximum value substantially reduced relative to the high peak value in curve 58. The large area under curve 60 indicates high energy absorption. The phenomenon represented by curve 58 can result in the loss of structural integrity for the fuselage and support structure for the seats and large overhead masses.

Through the present invention, provision may be made such that the fuselage will absorb crash energy through a controlled deformation of elements in the crush zone without exceeding the structural capability of the floor 32. Compartments such as the passenger seat area and the pilot's cabin stay in place and thus the occupied areas maintain livable volumes.

FIG. 4

Figure 4:
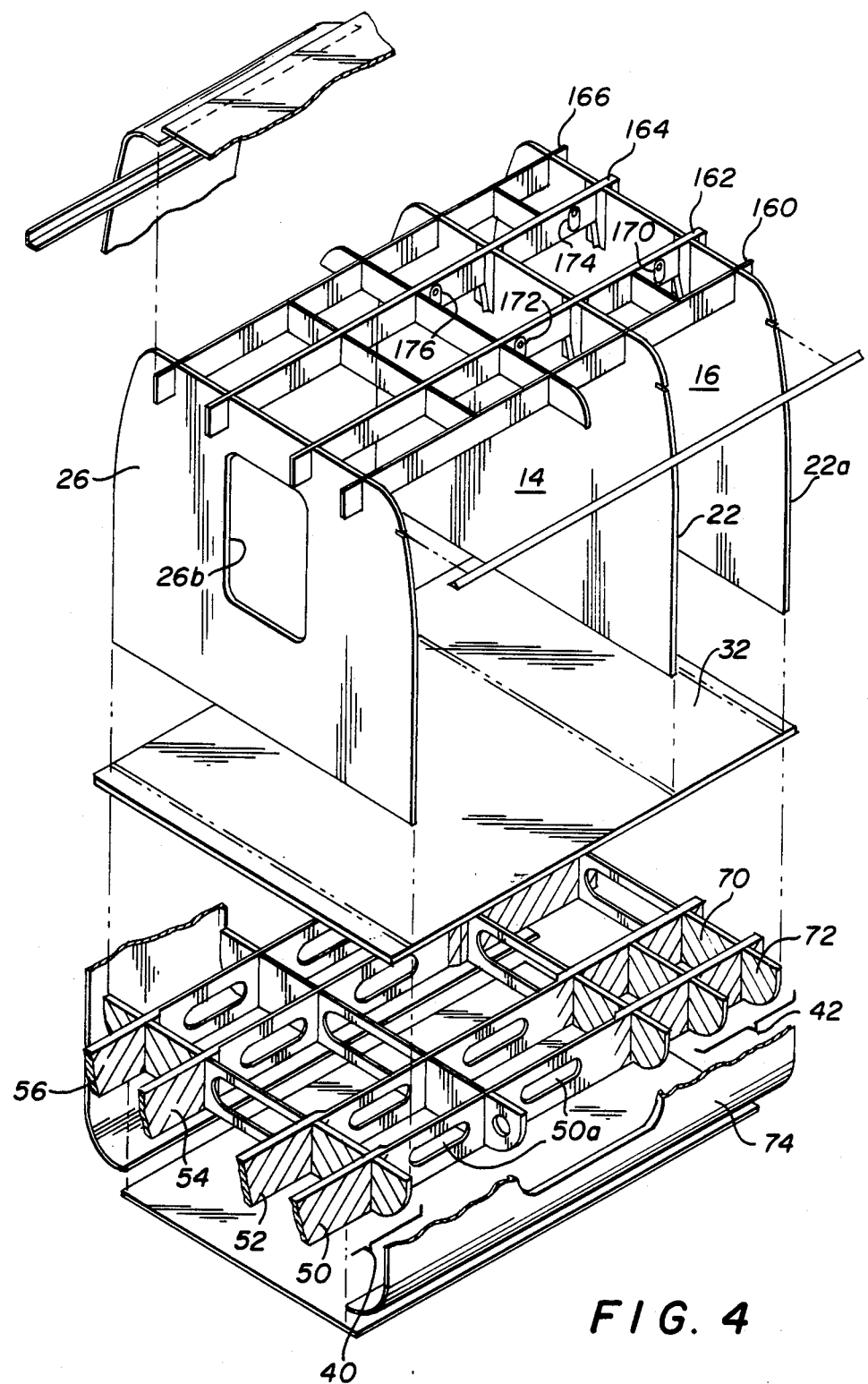
FIG. 4 is an exploded isometric view of a cabin.

Referring now to FIG. 4 an exploded view of the cabin of FIG. 3 has been shown with the high strength floor 32 elevated above the upper surface of keel beams 50-56. As indicated, the keel beams are spaced laterally one from another. Typically the beams 50-56 would be of the order of 10 to 12 inches deep. The beams would extend more of the length of the fuselage than shown and would comprise relatively thin longitudinal panels centrally relieved or cut out as indicated by the ports 50a in beam 50. Beams 50 and 52 are maintained in laterally spaced apart relation by lateral intersecting beams such as beam 70. Beams 50 and 52 in the region 42 below fuel compartment 16 are shown as being thicker than in the portion beneath the passenger compartment 14. The beams such as beam 70 are of similar construction. Outer lateral panels such as panel 72 extend outboard of beam 50 and have a curved lower outer surface to conform with the curvature of the skin 74. In the form shown, there are three outboard panels such as unit 72 on the left hand side and similarly three such outboard panels on the right hand side. Thus there are four controlled crushable cells in the region 42 below the fuel compartment 16 and two cells in the region immediately behind the pilots cockpit. The cells are crushable while the beam materials therebetween cells is frangible.

FIGS. 5-12

Energy absorbing structures formed of composite materials embodying the present invention are illustrated in FIGS. 5-12.

Figure 5:
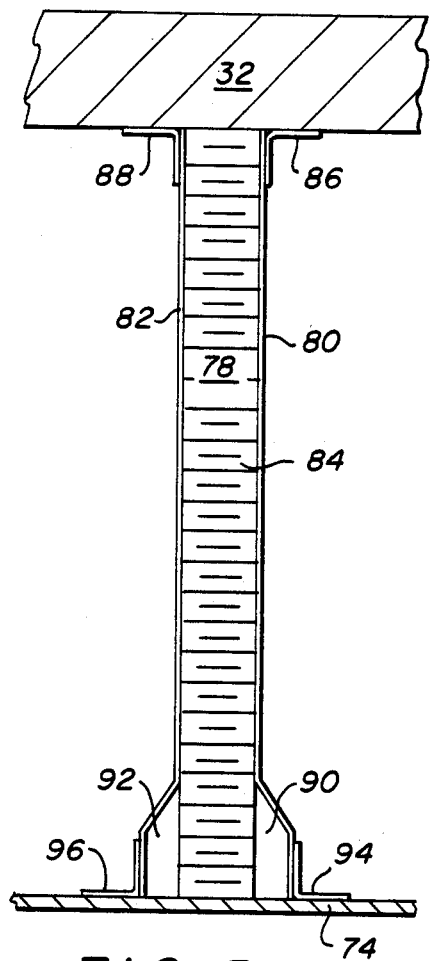
FIG. 5 is a sectional view of one form of crushable structure with a joggled bottom section to initiate crushing.

In FIG. 5 an embodiment of a crushable panel is illustrated extending between the bottom surface of floor 32 and the upper inner face of the skin 74. The sandwich panel 78 shown in section is comprised of outer composite sheet laminates 80 and 82 adhered to and unitized with opposite faces of a central honeycomb core 84.

Core 84 may suitably be made of a non-metallic honeycomb core material of the type manufactured by the DuPont Company and identified as Nomex Core Material, the same being a polyimide fiber-phenolic resin material. The cells of the honeycomb 84 extend horizontally. Sheet laminates 80 and 82 are adhered to the ends of the honeycomb cells by a laminating resin. A thin composite angle strip 86 and a second such strip 88 at the upper end of the panel are attached by a suitable adhesive to laminates 80 and 82 and to structure such as the undersurface of the floor 32.

At the bottom of panel 78 the laminates are bulged or joggled with the zones 90 and 92 filled with foam material. Angle strips 94 and 96 are adhesively attached to the sides of laminates 80 and 82 and to the inner face of the skin 74.

Upon crashing, laminates 80 and 82 FIG. 5 begin to fold horizontally from bottom up and absorb energy as laminates 80 and 82 progressively and locally buckle or fold, becoming corrugated. The structure involving the bulge or joggled portion serves as a trigger mechanisms to assure starting of folding at the lower end of the panel 78. The crushable structure thus controls loads in a crash with no sharp peak forces and produces high energy absorption with a rectangular-shaped load-deflection response as shown in curve 60, FIG. 3.

Figure 6:
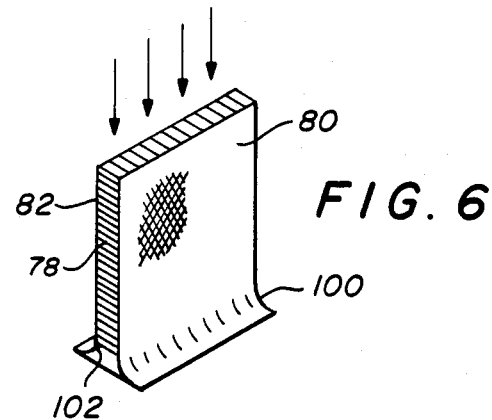
FIG. 6 is a modification of the structure of FIG. 5 with large curved bottom section to initiate crushing.

FIG. 6 shows a modified form of the panel 78. In this embodiment, laminates 80 and 82 of FIG. 5 are continuous from top to bottom but have a large radius bottom flange on either side of the sandwich 78. The bottom flange is then adhesively secured to the inner face of skin 74. The large radius flange 102 serves as an initiator to trigger crushing and folding beginning at the bottom.

Progressive folding as the panel is crushed is illustrated in FIG. 6a. Plate I shows the panel undistorted. Plate II illustrates the panel partly folded from a beginning at the bottom. The laminate material in the large radius curve at the bottom initially folds inward followed by successive outward and inner folds thereabove as shown in plate III.

The end result in plate III shows the side panels 80 and 82 completely crushed and folded. Energy is absorbed as the folding progresses upward to the top of the panel.

Figure 7:
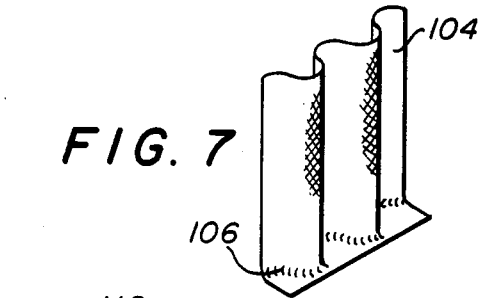
FIG. 7 is a sine wave structure with a curved bottom section.

FIG. 7 shows a different selectively controlled crushable structure wherein the panel 104 is of sine wave configuration with undulations extending vertically and with a molded bottom large radius section leading to a flange 106. This embodiment, rather than of sandwich construction, has self-supporting sine wave convolutions forming vertical partial columns which progressively are crushed beginning as the bottom flange 106.

Figure 8:
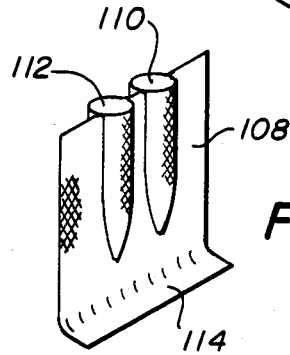
FIG. 8 is an integral tube structure with a curved bottom section.

FIG. 8 illustrates a further embodiment of the crushable structure utilized in accordance with the present invention and comprises a panel 108 in which self-supporting integral tubes are formed, such as tubes 110 and 112. The panel 108 is formed to have large radius flange 114 at the bottom where folding begins when crushing is initiated.

Figure 9:
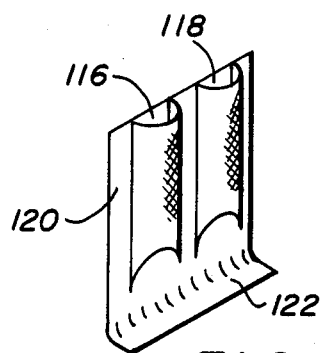
FIG. 9 is a half tube stiffner section with a curved bottom portion.

FIG. 9 illustrates a further embodiment wherein half tube stiffners 116 and 118 are integrated with and connected to a panel 120 which in turn has formed through a large radius flange 122 to control initiation of the crushing of the self-supporting half tube stiffened panel.

Figure 10:
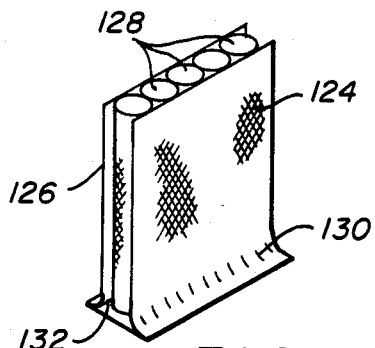
FIG. 10 is a tube cored crushable structure with large curved bottom portion.

FIG. 10 illustrates a further modification of a crushable structure wherein a sandwich is made of outer laminates 124 and 126 between which are provided a series of parallel cylindrical tubes 128. Panels 124 and 126 are formed with large radius flanges 130 and 132 to control the initiation of crushing.

In FIG. 5, the outer laminates on the column 78 are joggled outwardly to control initiation of folding. In FIG. 11, the initiation of crushing is controlled by having inwardly beaded portions 134 and 136 at the bottom of the laminate to initiate crushing at the bottom.

The foregoing description of FIGS. 5–11 has been set forth in terms of utilizing materials to form the various panels which when crushed exhibit a folding action beginning at the bottom. This is best illustrated in FIG. 6a. Such folding action is characteristic of structure shown in FIGS. 5–11 when the manufacture of those panels is of a material such as Kevlar. This is because in Kevlar units the fibers in the laminates are continuous and remain unbroken during folding.

If the panels are made of graphite epoxy, then the fibers break upon application of crushing forces and the laminates then undergo a progressive shattering mode of failure, beginning at the bottom. Thus Kevlar laminates and graphite laminates of exactly the same configuration will undergo folding and shattering respectively beginning at the same point, namely at the bottom, because of the presence of the triggering configuration. Units made of graphite epoxy have exhibited somewhat better energy absorbing capacity compared with units made of Kevlar epoxy. Units of Kevlar epoxy exhibit greater residual structural integrity as compared with units made of graphite epoxy. However, both Kevlar epoxy units and graphite epoxy units are far superior to conventional structural designs, the performance of which is represented by the curve 58, FIG. 3.

In each case, the absorbers of FIGS. 5–11 are characterized by at least one thin panel of composite materials for reacting compression forces which are applied in the plane of the panel. In the case of FIGS. 5, 6, 10 and 11 force is applied directly to the top of the two side panels and, with lateral components, to the two panels at the bottom. In the case of FIG. 7, the forces would be applied in the median plane of the sine wave convolutions. In the case of FIG. 8, forces would be applied in the plane of the webbing between the included cylinders. In the case of FIG. 9, the forces would be applied in the plane of the web 120. In each case, the panels are constructed to resist sheet or overall bending failure. The applied forces at one edge have a lateral component to initiate local folding parallel to the bottom edge to initiate the progressive crushing.

FIG. 12 illustrates an application of the present invention and more particularly, a multi-cell form for providing crushable structures as in the zone 42, FIGS. 1 and 4. Keel beams 50 and 52 in the frangible areas are thin three ply laminates as above described. In the region of intersecting cross beams 70, 136 and 137, the beams 50 and 52 are modified so that in cross section they are the same as the sandwich structure shown in FIGS. 5 or 6. Similarly, the intersecting beams 70, 136 and 137 are of the controlled crushable structure of FIGS. 5 or 6. The outer extensions 72, 138 and 139 are of similar construction. In this embodiment, thin composite corner angles 140–145 are adhesively secured in the corners at intersections of the beams 50 and 52 with the cross intersecting beams 70, 136 and 137 and the outer extension 72, 138 and 139. While not shown, similar corner angles would be secured at every location in FIG. 12 where the crushable beam structures intersect or are joined. The combination of elements shown in FIG. 12 thus provides a cell of selectively controlled crushable elements. The bottom of each of the crushable panels of FIG. 12 will have starting structure of the type shown in FIGS. 5 or 6 or 11.

In the embodiment of the present invention the sine wave panel of FIG. 7 was made of material identified as Kevlar 49 Fiber, ±45°, style KDB-170 marketed by Knytex Proform Inc. of Seguin, Texas and identified as a knitted nonwoven fabric with a weight of 8.5 ounces per square yard. The material was of 17.0 ounces per square yard, double biased with 14.4 ends per inch in each direction. The material is further identified as Dupont Kevlar 49, 2130 Denier yarn (15.5 microns fiber diameter). Through the thickness, knitting material used was of type 968 Dupont 70 Denier, high tenacity polyester stitch yarn (2.1% of the total weight).

Various numbers of plys, material orientations and knitting materials can be used with the material above identified as acquired from Knytex Proform, Inc. The composite materials to be used in the energy absorbing structures may be fibers or graphite, Kevlar or fiberglass. The resins may be either thermosetting or thermoplastic. The material form may be fabric, tape or roving fabric from Knytex Proform, Inc.

The beams 50, 52, 54 and 56, FIG. 4, and laminates 80 and 82, FIG. 5, may comprise three ply Kevlar/epoxy fabric. Beams 50–56 would be of the order of 10 to 12 inches high. The panel 78 is of the order of one inch thick.

In FIG. 7, the undulations of the sine wave structure are of dimensions about ¾ inch peak to peak for a 10 to 12 inch deep panel. The integral tube structure of FIG. 8 involves tubes of about one inch diameter. The half tube stiffners of FIG. 9 would be about one-half inch radius. The cylinders of FIG. 10 would be about one inch in diameter.

The foregoing description as dealt with several embodiments of the invention. However it will be understood that variations may be resorted to in carrying out the invention. The materials used in examples given are representative.

In use in a helicopter, the controlled crushable elements may be employed beneath a high strength cabin floor in regions where the roof load is reacted on the floor with frangible structure under the occupied compartments and with the energy absorbers between the bottom body skin and the cabin floor. By such use of the absorbers of the present invention, exceeding the load limit of the fuselage may be avoided. Important to the operation of the invention is the control of the initiation and the load magnitude such that the energy, proportional to the square of velocity ($V^2$), is below set limits.

I claim:

1. An energy absorber which comprises:

thin panel means formed of composite materials for reacting compression forces in the plane of said panel means between first and second opposed edges thereof, said panel means being constructed to resist overall bending failure when force is applied to said opposed edges;

said thin panel means further including a laminate sheet leading by way of a large angle curve portion to a perpendicular flange and with half tube members integrated to the face of said laminate sheet above said flange in a parallel array extending laterally of said laminate sheet; and force receiving structure for receiving forces directly to said first edge and for receiving forces to said second edge of said panel means with a lateral component to initiate local folding parallel to said second edge for progressive crushing and local folding of said panel mean beginning at said second edge.

2. The combination set forth in claim 1 wherein said thin panel means is comprised of two parallel laminate sheets adhesively secured to opposite faces of a filler panel.

3. The combination set forth in claim 1 wherein said panel means comprises a pair of laminate sheets with cylindrical structures integrated between confronting faces of said sheets.

4. The combination set forth in claim 1 wherein the force receiving structure at said second edge comprises a bulge in said panel means for directing said lateral component.

5. The combination set forth in claim 1 wherein said force receiving structure at said second edge of said panel comprises a large angle curved portion leading to a flange section at said second edge of said panel.

6. The combination set forth in claim 2 in which said force receiving structure comprises inwardly beaded grooves in each of said sheets adjacent and parallel said second edge for directing said lateral component.

* * * * *